United States Patent [19]

Dadisman

[11] 4,016,983

[45] Apr. 12, 1977

[54] COMPRESSED GAS BOTTLE HANDLER

[76] Inventor: Andrew J. Dadisman, 4191 Caledonia Drive, San Diego, Calif. 92111

[22] Filed: Oct. 16, 1975

[21] Appl. No.: 622,946

[52] U.S. Cl. .............................. 214/1 R; 248/351; 248/1

[51] Int. Cl.[2] .......................................... B25J 3/00

[58] Field of Search ................ 248/1, 37.3, 49, 75, 248/80, 102, 105, 128, 133, 143, 351, 352, 511, 520; 214/1 R

[56] References Cited

UNITED STATES PATENTS

| | | | |
|---|---|---|---|
| 2,684,222 | 7/1954 | Miller | 248/49 |
| 3,355,035 | 11/1967 | Bennett | 214/1 R |
| 3,891,177 | 6/1975 | Jerrel | 248/352 |

*Primary Examiner*—William H. Schultz
*Attorney, Agent, or Firm*—Brown & Martin

[57] ABSTRACT

A compressed gas bottle handler in which a half ring shaped bearing member is supported by an upper angled plate on a vertical plate and base at a height and at an angle wherein a tilted gas bottle can rest on the longitudinal surface of the bearing plate and is thus tiltable at substantially its mid-point allowing the gas bottle to be moved or positioned at a height above the ground without necessitating lifting the entire weight of the gas bottle.

5 Claims, 4 Drawing Figures

COMPRESSED GAS BOTTLE HANDLER

BACKGROUND OF THE INVENTION

Gas bottles that contain certain gases under pressure are usually made of steel or other similar type heavy materials. These gas bottles enclose, for example, nitrogen, oxygen, argon, $CO_2$, or combinations thereof, and normally have a weight that ranges from about 150 pounds to 190 pounds. It is often times necessary to move such gas bottles to new locations or to position the bottles from a supporting surface onto, for example, welding machine carts or the like. While such bottles may be rotated on an edge and thus pivotally moved, this is usually done at the risk of having the bottle fall over, which can be dangerous. Further it is not possible to lift the bottle by merely rotating it on one edge.

Where many job descriptions and many state laws limit the weight that a person can be required to lift to the order of 50 pounds or less, it is necessary to provide fork lifts or other types of complicated mechanisms and machines to lift such gas bottles.

Therefore, it is advantageous to have a simple, easy to use, and inexpensive and yet strongly constructed device for handling and moving gas bottles and lifting the gas bottles to higher surfaces, such as to welding machine carts or the like.

SUMMARY OF THE INVENTION

In a preferred embodiment of this invention, a vertical plate is secured at a normal angle to a supporting base plate means. The upper edge of the vertical plate has a substantially straight line and horizontal edge to which is secured an upper plate. The upper plate has an acute angle with the vertical plate, the upper edge of the upper plate is recessed to support a half ring bearing plate. The bearing plate lies in the plane of the upper plate with its longitudinal or axial surfaces extending at an angle normal to the upper plate. Thus these surfaces have an acute angle with the ground surface.

The vertical plate is supported in its vertical position by brace plate means that are positioned at an extension from the angles of intersection of the vertical plate and base plate, either at the center of the vertical plate or at opposite ends thereof, and at opposite sides thereof.

The height of the vertical plate and upper plate is such that it positions the bearing surface at a height lower than one-half the height of the gas bottles. Thus the gas bottle is tilted to a position where the cylindrical side surface fits into the circular bearing plate, and is supported at a position at or near mid-point of the gas bottle. The bearing plate has a cushioned pad thereon that cushions the contact of the side of the gas bottle with the bearing plate surface.

When in position, the gas bottle may be tilted in a balanced condition, lifting the other ends of the gas bottle to a height above the surface on which the gas bottle was previously resting, and can thus then be tilted into its new position, such as on the raised surface of a welding machine cart or the like. Further, the lower end of the bottle can be moved laterally to a new position by merely rotating the bottle axially to a new position, and then moving the bottle to an upright position. Further, when the bottle is rested in a tilted condition on the bearing surface, the entire bottle handler can then be slidably moved on its base plate surface to a new location with the gas bottle being moved therewith.

It is therefore an object of this invention to provide a new and improved compressed gas bottle handler.

Other objects and many advantages of this invention will become more apparent upon a reading of the following detailed description and an examination of the drawing, wherein like reference numerals designate like parts throughout and in which:

FIG. 4 is a diagram illustrating the use of the gas bottle handler in lifting the lower end of the gas bottle onto a raised surface, such as a routing machine cart or the like.

Figure 1:
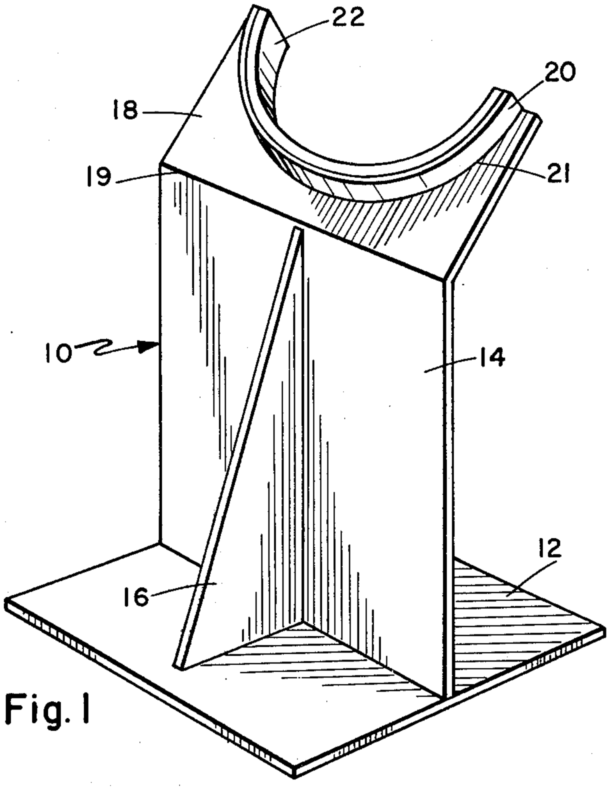
FIG. 1 is a perspective view of an embodiment of the gas bottle handler.
Figure 2:
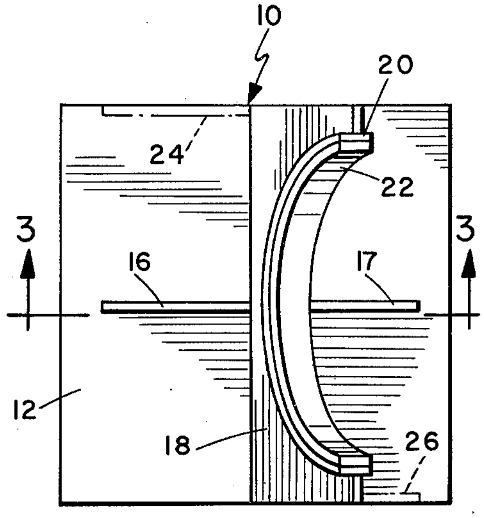
FIG. 2 is a top plan view of the embodiment of the gas bottle handler illustrated in FIG. 1.
Figure 3:
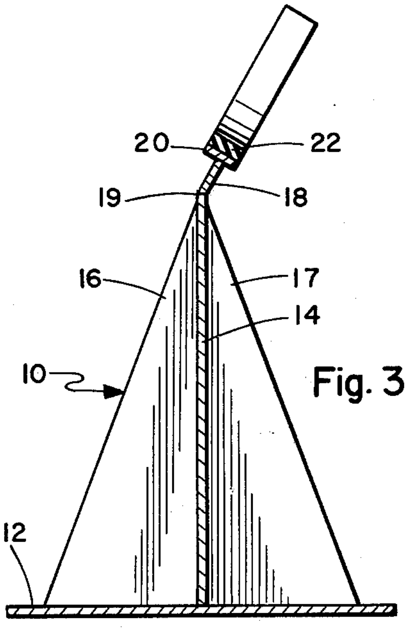
FIG. 3 is a sectional view taken along lines 3—3 of FIG. 2.

Referring now to FIGS. 1 through 4, the compressed bottle handler has a base plate 12 that has a flat construction. A flat vertical plate 14 is welded on its end edge to the base plate with side support plates 16 and 17 welded to the respective side surfaces of the bottom plate 12 and the vertical plate 14, and extending from the intersection of the base plate 12 and vertical plate 14. It may be noted that in FIG. 1, the support plates 16 and 17 are positioned at or near the center of the width of the vertical plate 14. In FIG. 2, a different position of the plates is illustrated by the dotted line illustrations of plates 24 and 26, wherein the plates having a similar shape as support members 16 and 17 are moved to the respective side edges of plate 14 and secured to the opposite sides thereof.

An upper plate 18 is welded to the upper edge 19 and is positioned at an acute angle with plate 14. Plate 18 has the recess 21 in which a half ring bearing member 20 is secured, such as by welding or the like. This provides a bearing surface that has parallel sections along the longitudinal length or axial length of the bearing member 20. This bearing plane surface is normal to the surface of plate 18 and is an acute angle with the surface on which plate 12 is positioned. The bearing surface also has a cushioned member 22 that may be of hard rubber.

Figure 4:
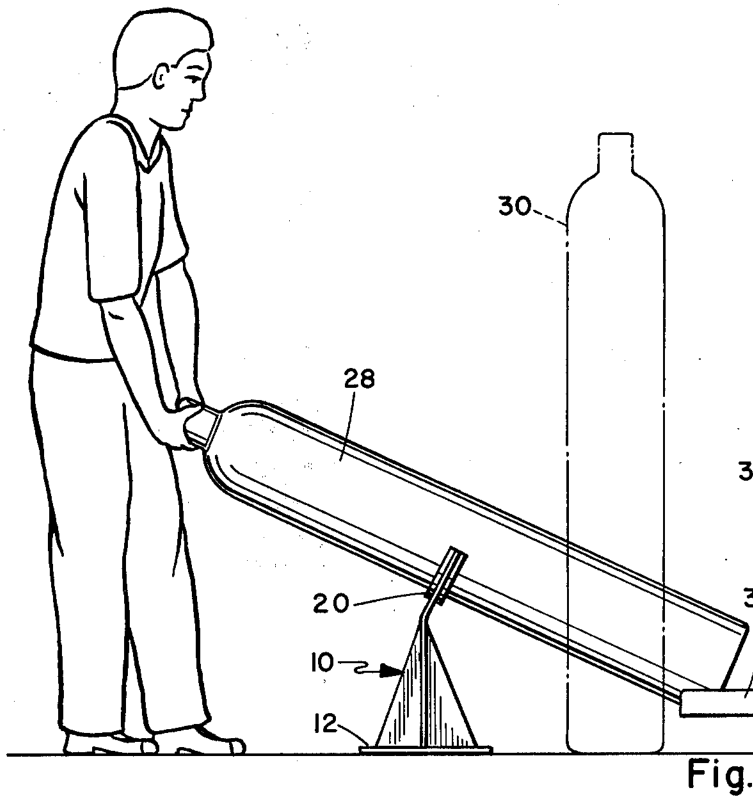
Figure 4:
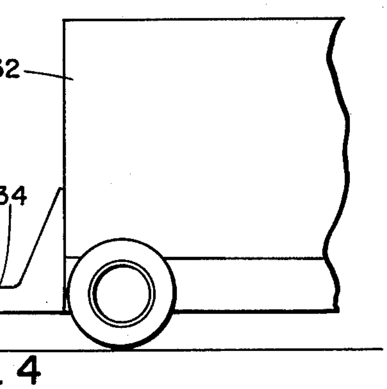

It will be noted that the combined height of the vertical plate member 14 and upper plate member 18 are such, see FIG. 4, that they extend the bearing surface to a height that is less than the mid-point of height of gas bottle 30; but normally at a height above one quarter of the height of the bottle 30. Gas bottle 30, indicated in dotted lines, in operation may be pivoted down until its cylindrical side surface rests in the bearing member 20, wherein the lower end of the bottle 28 may be raised to a resting position on the platform 34 of the welding cart 32. It may be understood that the diameter of the bearing surface 20 is larger than the diameter of the bottles 28 and 30. So bottle 28 may be pivoted laterally, thus laterally moving the lower end of the bottle 28 allowing the bottle handler to move the position of the uprighted bottle 28 to a new location. Also when the gas bottle is in the position as illustrated generally in FIG. 4, the bottle 30 may then be moved to a substantially horizontal position on the bearing member 20, and the bottle handler 10 then may be slid or moved with the bottle positioned thereon to a new location, providing an easy means of moving the gas bottle short distances to different locations.

While the bottles normally weight, when filled, between 150 to 200 pounds, the amount of lifting force required maneuver a bottle as previously described is considerably reduced.

Having described my invention, I now claim:

1. A compressed gas bottle handling device for supporting bottles for movement thereof comprising, an enlarged flat horizontally extending base plate for supporting said handling device for vertical and horizontal loads, a vertical plate secured normal to said base plate and extending upward therefrom, triangular shaped side plate brace means secured to said base plate and said vertical plate along lengths thereof extending from the intersection of said plates, an upper plate secured to the upper end of the vertical plate and at fixed acute angle therewith, the upper edge of the upper plate having a semicircular recess formed therein, a half ring bearing plate secured in said semicircular recess for receiving the cylindrical side surface of a tilted gas bottle for supporting same, the axial surface of said bearing plate being fixed at an acute angle to the ground surface, said vertical plate and upper plate having combined lengths that position the half ring bearing plate at a height less than one-half of a gas bottle to be received therein and a resilient cushion member positioned on the surface of the bearing plate.

2. A compressed gas bottle handler as claimed in claim 1 in which, said brace plate means comprising a plate positioned on each opposite side of said vertical plate at the center thereof.

3. A compressed gas bottle handler as claimed in claim 1 in which, said brace plate means comprising a pair of plates with each of said plates being secured to said vertical and base plates at opposite ends thereof and at opposite sides thereof.

4. A compressed gas bottle handler as claimed in claim 1 in which, said vertical plate and upper plate having combined lengths that position the half ring bearing plate at a height greater than one-fourth the height of the gas bottle.

5. A compressed gas bottle handler as claimed in claim 1 in which, said upper edge of said vertical plate having a straight line edge and the lower edge of said upper plate having a straight line edge, and said two edges being joined forming the connection therebetween.

* * * * *